United States Patent
Chang et al.

(10) Patent No.: US 6,235,805 B1
(45) Date of Patent: May 22, 2001

(54) STATIC-FREE SYNTHETIC RUBBER

(76) Inventors: Kuo-Hsiang Chang, No. 10-5, Mintsu Rd., Shen-Kang Hsiang; Yu-Chou Lin, No. 5, Alley 4, Lane 145, Tateh N. Rd., Tan-Tzu Hsiang, both of Taichung Hsien (TW)

( * ) Notice: Subject to any disclaimer, the term of this patent is extended or adjusted under 35 U.S.C. 154(b) by 0 days.

(21) Appl. No.: 09/642,844

(22) Filed: Aug. 22, 2000

(51) Int. Cl.$^7$ ............................. C08L 47/00; B29C 67/20
(52) U.S. Cl. .................... 521/140; 521/140; 521/134; 521/92; 521/91; 521/93; 521/96; 521/97; 521/98; 264/46.3
(58) Field of Search ............................. 521/134, 70, 140, 521/91, 92, 93, 96, 97, 98; 264/46.3

(56) References Cited

U.S. PATENT DOCUMENTS 5,938,878 * 8/1999 Hurley et al. .................... 156/219

OTHER PUBLICATIONS

Lewis, Richard J ., Sr. "Hawley's Condensed Chemical Dictionary," 13th ed.; John Wiley & Sons, Inc.: New York, 1997; pp. 4, 333, 448, 578.*

* cited by examiner

Primary Examiner—James J. Seidleck
Assistant Examiner—Melanie D. Bagwell
(74) Attorney, Agent, or Firm—Rosenberg, Klein & Lee

(57) ABSTRACT

A process for producing static-free synthetic rubber includes mixing acrylonitrile-butadiene, Anti-static agent, Activated zinc oxide, Zinc stearate, HI-sil (EPDM), Plasticizer, and Stearic Acid prior to a kneading process at 140 degrees Celsius for 8 to 12 minutes. (DCP) Peroxides and Blowing agents are added to the kneeing mixture two minutes before the end of the kneeding process. After the kneeding process, the resultant mixture is fed through rollers to form a sheet of the synthetic rubber. The sheet is then cut into appropriately-sized pieces and put into a mold, where the pieces are subjected to high pressure and a temperature of 160 degrees Celsius. The pieces are then left to cool, and then be used for articles such as static-free footwear.

3 Claims, 3 Drawing Sheets

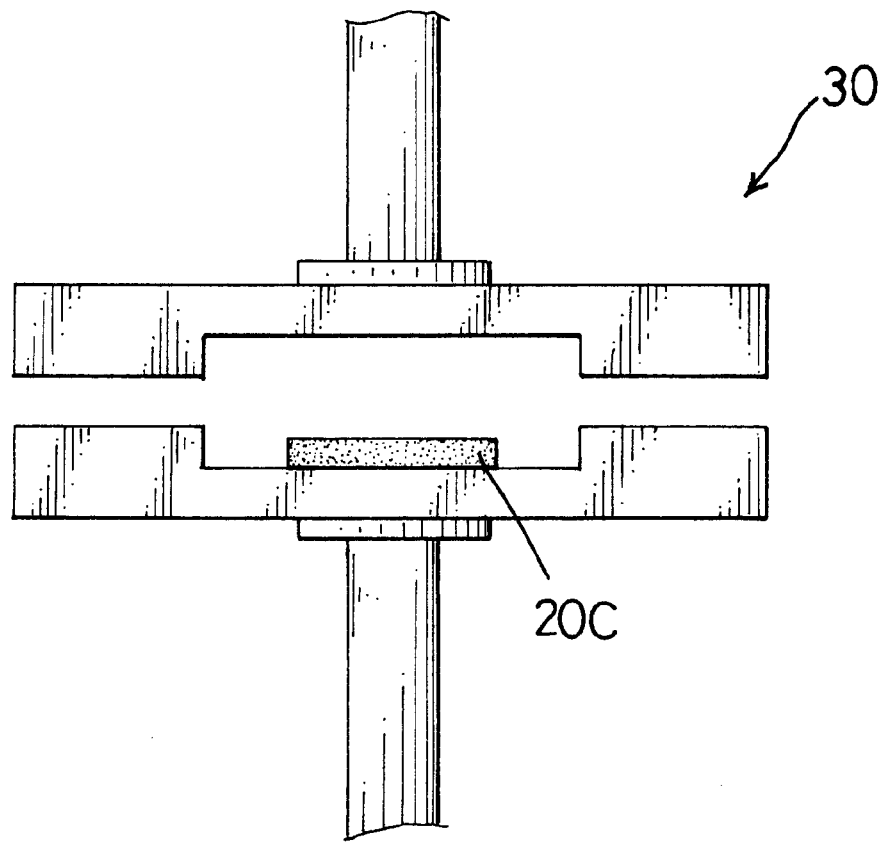
F I G . 3

STATIC-FREE SYNTHETIC RUBBER

BACKGROUND OF THE INVENTION

Field of the Invention

The present invention relates to a synthetic rubber, especially a synthetic rubber which remains free of static electricity while being used.

Synthetic rubbers have many applications and are now particularly important in the Information Technology industry, where electronic devices such as semi-conductors etc, can be seriously damaged by static electricity during their manufacture. The static electricity is often caused by shoes of workers, and then it travels through the atmosphere to the components being produced. Although so-called "static-free" rooms are devised to try to eliminate the occurrence of static, it is found that static still occurs, again often from the footwear of the workers as they move around. Thus, there is a long and unfulfilled need for a synthetic rubber which is completely static free when in use, especially static-free synthetic rubber for use on floors and footwear in the production of electrical components.

SUMMARY OF THE INVENTION

The main objective of the invention is to provide a synthetic rubber which is completely free from the production of static electricity.

A further objective of the invention is to produce a static-free synthetic rubber for use in preparing foot wear and floor coverings.

Other objects, advantages and novel features of the invention will become more apparent from the following detailed description when taken in conjunction with the accompanying drawings.

BRIEF DESCRIPTION OF THE DRAWINGS

FIG. 3 is a schematic view of a portion of the synthetic rubber of the present invention prior to be further processed in a mold.

DETAILED DESCRIPTION OF THE PREFERRED EMBODIMENT

Figure 1:
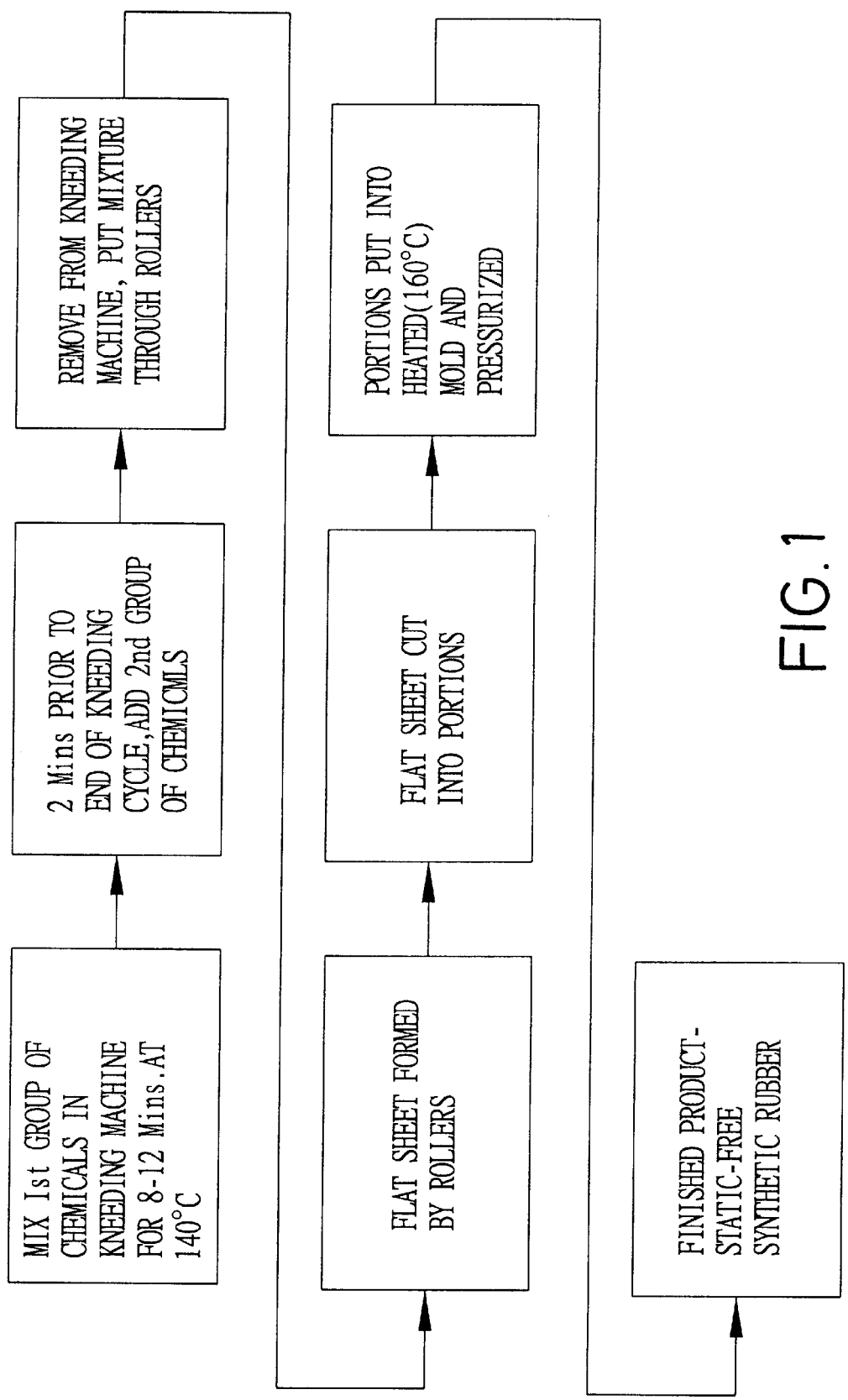
FIG. 1 is a flow chart of the production of static-free synthetic rubber in accordance with the present invention.

The present invention relates to a static-free synthetic rubber, and involves the process as shown in FIG. 1.

The following ingredients are mixed together in ratios of weight as indicated in the parentheses:
Ethylene Vinyl Acetate (38.14%)
Acrylonitrile-butadiene (7.63%)
Anti-static agent (9.77%)
Activated Zinc Oxide (3.81%)
Zinc Stearate (1.07%)
HI-Sil (24.41%)
EPDM (7.63%)
Plasticizer (3.36%)
Stearic Acid (1.07%)

Figure 2:
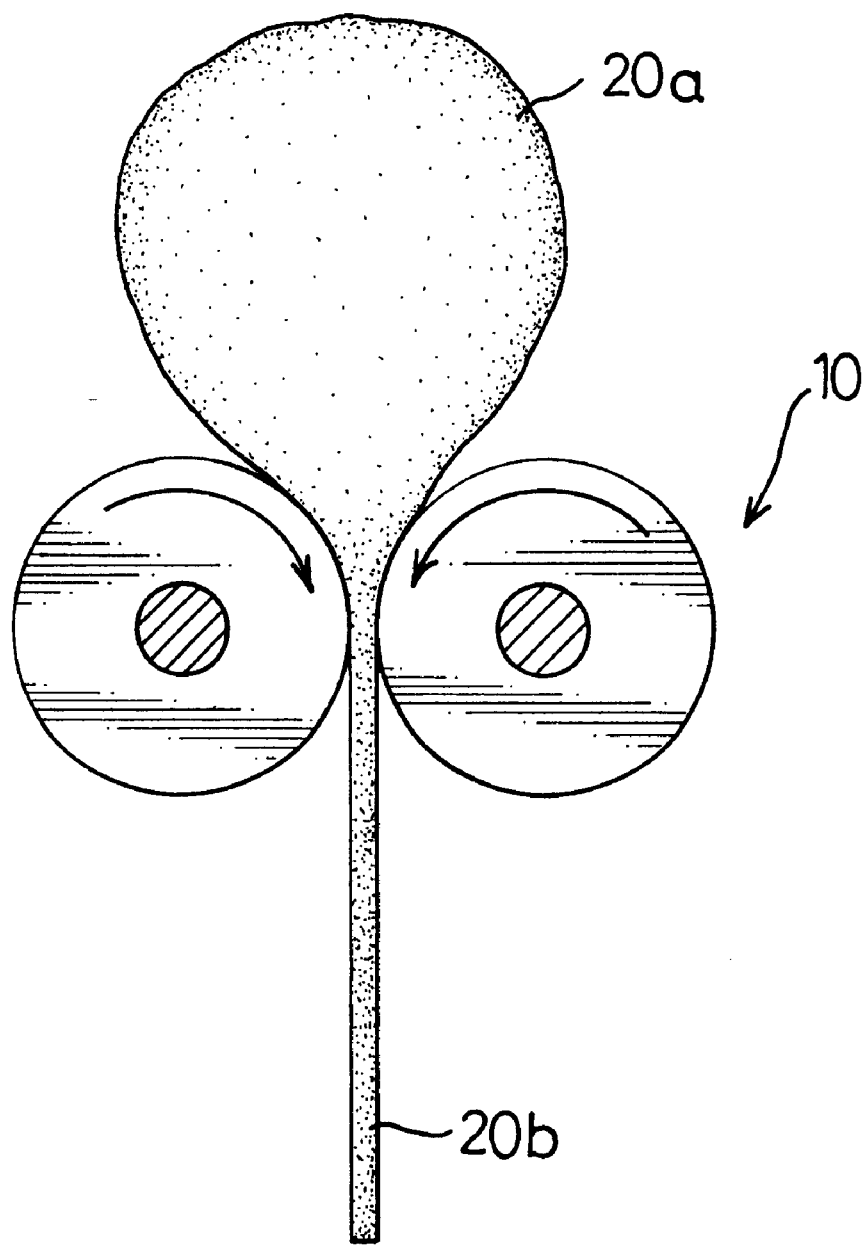
FIG. 2 is a schematic view of the synthetic rubber of the present invention being passed through a pair of rollers.

A resulting mixture (20) is put in a kneading machine, and kneaded for 8 to 12 minutes at 140 degrees Celsius. Two minutes before the projected end of the kneading cycle, (DCP) Peroxides (0.98%) and (AC) Blowing agents (2.14%) are added to produce a mixture (20A). After completion of the kneeding cycle, the mixture (20A) is removed and then fed through rollers (10) as shown in FIG. 2, to produce a sheet (20B) of the synthetic rubber in accordance with the present invention. Referring to FIG. 3, the sheet (20B) is cut into portions (20C), each of which is put into a mold (30) comprising two halves. The mold (30) is preheated to 160 degrees Celsius and the two halves are brought together, whereafter the portion (20C) is subjected to high pressure for 10 minutes, and then cooled.

The portions (20C) can be formed into shoe soles, floor mats, cushions for seating, all of which are static-free and so can be used in environments requiring which are demanded to be static-free, such as in the production of components for the Information Technology industry.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A static-free synthetic rubber, comprising:

Ethylene Vinyl Acetate;
Acrylonitrile-butadiene;
Anti-static agent;
Activated Zinc Oxide;
Zinc Stearate;
HI-sil;
(EPDM);
Plasticizer;
Stearic Acid;
(DCP) Peroxides; and
(AC) Blowing agents;
wherein the ingredients are in the following weight ratios:
  38.14% Ethylene Vinyl Acetate;
  7.63% Acrylonitrile-butadiene;
  9.77% Anti-static agent;
  3.81% Activated Zinc Oxide;
  1.07% Zinc Stearate;
  24.41% HI-sil;
  7.63% (EPDM);
  3.36% plasticizer; and
  1.07% Stearic Acid.

2. The static-free synthetic rubber as claimed in claim 1, further including and 2.14% (AC) blowing agents.

3. A process for producing a static-free synthetic rubber, including the steps:

(a) mixing the following ingredients in percentage weight ratios as shown,
  38.14% Ethylene Vinyl Acetate;
  7.63% Acrylonitrile-butadiene;
  9.77% Anti-static agent;
  3.81% Activated Zinc Oxide;
  1.07% Zinc Stearate;
  24.41% HI-sil;
  7.63% (EPDM);
  3.36% Plasticizer; and
  1.07% Stearic Acid;

(b) adding the resulting mixture from step (a) for a kneading cycle in a kneading machine for a duration of a minimum 8 minutes and a maximum of 12 minutes;

wherein a further step of adding 0.98% (DCP) Peroxides and 2.14% Blowing agents to the disclosed mixture two minutes is added before the end of the disclosed kneading cycle;

wherein the disclosed mixture in the kneading cycle is heated to 140 degrees Celsius;

wherein after the kneading cycle is finished, the mixture is fed through rollers to produce a sheet of the static-free synthetic rubber;

wherein the sheet of synthetic rubber is cut into pieces and the pieces are put into a mold to be subject to high pressure at a temperature of 160 degrees Celsius for 10 minutes.

* * * * *